US009242734B2

(12) United States Patent
Gumm et al.

(10) Patent No.: US 9,242,734 B2
(45) Date of Patent: Jan. 26, 2016

(54) DEVICE AND METHOD FOR DISTRIBUTING AIR IN A CARGO AIRCRAFT

(75) Inventors: Stefan Gumm, Hamburg (DE); Manuela Horl, Glinde (DE); Dariusz Krakowski, Buxtehude (DE); Steffen Kalsow, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1593 days.

(21) Appl. No.: 12/294,635

(22) PCT Filed: Mar. 29, 2007

(86) PCT No.: PCT/EP2007/002847
§ 371 (c)(1),
(2), (4) Date: Jun. 21, 2010

(87) PCT Pub. No.: WO2007/110248
PCT Pub. Date: Oct. 4, 2007

(65) Prior Publication Data
US 2010/0273410 A1    Oct. 28, 2010

(30) Foreign Application Priority Data
Mar. 29, 2006   (DE) .......................... 10 2006 014 572

(51) Int. Cl.
*B64D 13/00*        (2006.01)
*B64D 13/06*        (2006.01)
(52) U.S. Cl.
CPC .......... *B64D 13/06* (2013.01); *B64D 2013/064* (2013.01); *B64D 2013/0618* (2013.01); *Y02T 50/56* (2013.01)
(58) Field of Classification Search
CPC ..... B64D 13/06; B64D 13/08; B64D 13/0688
USPC .................................................. 454/71–77
See application file for complete search history.

(56) References Cited

U.S. PATENT DOCUMENTS 2,485,522 A * 10/1949 Andersen ......................... 62/150
2,851,254 A *  9/1958 Messinger et al. ............ 165/235
(Continued)

FOREIGN PATENT DOCUMENTS

DE           10361637       8/2005
JP         2001296070      10/2001
(Continued)

OTHER PUBLICATIONS

Andre, Ludovic, Boeing 737 Systems Review: Air Conditioning & Pressurization, Smartcockpit.com, 2001 (retrieved on Oct. 22, 2013), Retrieved from the Internet: <https://web.archive.org/web/20010221214953/http://www.smartcockpit.com/>.*

(Continued)

*Primary Examiner* — Alissa Tompkins
*Assistant Examiner* — Jonathan Cotov
(74) *Attorney, Agent, or Firm* — Wood, Herron & Evans, LLP

(57) ABSTRACT

A device for distributing air in a cargo aircraft includes using an air distribution system which is connected to a cargo deck. The air distribution system includes a source for bleed air, at least one air conditioning unit for treating the bleed air, a mixing unit which receives an air supply of recirculation air exiting the cargo deck and treated bleed air from the air conditioning unit, and at least one shut-off valve between the mixing unit and the cargo deck in order to interrupt or completely release the air supply to the cargo deck. A control unit establishes a desired air volume balance for the current operating state of the air distribution system and adjusts the flow volume through the at least one air conditioning unit such that the pressure prevailing in the mixing unit remains at a constant, predetermined value for all operating states.

11 Claims, 1 Drawing Sheet

(56) References Cited

U.S. PATENT DOCUMENTS

| | | | | |
|---|---|---|---|---|
| 2,979,916 | A * | 4/1961 | Mason | 62/172 |
| 4,523,517 | A * | 6/1985 | Cronin | 454/74 |
| 4,671,318 | A * | 6/1987 | Benson | 137/486 |
| 4,726,426 | A * | 2/1988 | Miller | 169/62 |
| 4,741,255 | A * | 5/1988 | Lancaster | 454/71 |
| 4,819,548 | A * | 4/1989 | Horstman | 454/76 |
| 5,135,161 | A * | 8/1992 | Goodman | B64D 13/08 137/118.06 |
| 5,145,124 | A * | 9/1992 | Brunskill et al. | 244/118.5 |
| 5,155,991 | A * | 10/1992 | Bruun | 60/785 |
| 5,479,983 | A * | 1/1996 | Fischer | B64D 13/08 165/205 |
| 5,516,330 | A * | 5/1996 | Dechow | B64D 13/08 165/235 |
| 5,545,084 | A * | 8/1996 | Fischer | B64D 13/08 454/76 |
| 5,890,957 | A * | 4/1999 | Scherer et al. | 454/76 |
| 5,897,079 | A * | 4/1999 | Specht et al. | 244/118.5 |
| 5,934,083 | A * | 8/1999 | Scherer | B64D 13/08 62/172 |
| 6,216,981 | B1 * | 4/2001 | Helm | 244/118.5 |
| 6,299,525 | B1 * | 10/2001 | Scheffler et al. | 454/76 |
| 6,306,032 | B1 * | 10/2001 | Scheffler | B64D 13/08 244/129.2 |
| 6,389,826 | B2 * | 5/2002 | Buchholz | 165/205 |
| 6,401,473 | B1 * | 6/2002 | Ng | B64D 13/06 454/71 |
| 6,449,963 | B1 * | 9/2002 | Ng et al. | 62/86 |
| 6,491,254 | B1 * | 12/2002 | Walkinshaw et al. | 244/118.5 |
| 6,544,114 | B2 * | 4/2003 | Buchholz | 454/74 |
| 6,681,591 | B2 * | 1/2004 | Defrancesco et al. | 62/401 |
| 6,782,701 | B2 * | 8/2004 | Liu et al. | 60/782 |
| 6,817,576 | B2 * | 11/2004 | Brady | B60H 1/00 244/118.5 |
| 6,948,325 | B1 * | 9/2005 | Axe | B64D 13/06 62/127 |
| 6,971,607 | B2 * | 12/2005 | McColgan | B64D 13/00 244/118.5 |
| 7,727,057 | B2 * | 6/2010 | Beier et al. | 454/76 |
| 7,849,931 | B2 * | 12/2010 | Ng | 169/62 |
| 7,878,887 | B2 * | 2/2011 | Elmers et al. | 454/71 |
| 7,980,928 | B2 * | 7/2011 | Markwart et al. | 454/76 |
| 8,015,973 | B2 * | 9/2011 | Geary | B64D 13/06 128/202.22 |
| 8,336,821 | B2 * | 12/2012 | Shell | B64D 13/06 165/108 |
| 8,435,103 | B2 * | 5/2013 | Centofante | 454/71 |
| 8,876,580 | B2 * | 11/2014 | Castro | 454/76 |
| 2001/0032472 | A1 * | 10/2001 | Buchholz | B64D 13/06 62/172 |
| 2003/0051500 | A1 * | 3/2003 | Asfia et al. | 62/402 |
| 2005/0051668 | A1 * | 3/2005 | Atkey | B64D 13/06 244/118.5 |
| 2001/0119585 | | 5/2007 | Centofante et al. | |
| 2007/0158499 | A1 * | 7/2007 | Whittingham | A61L 9/20 244/118.5 |
| 2010/0273410 | A1 * | 10/2010 | Gumm et al. | 454/76 |

FOREIGN PATENT DOCUMENTS

| | | |
|---|---|---|
| JP | 2007516893 | 6/2007 |
| JP | 2007520386 | 7/2007 |
| RU | 1762505 | 7/1994 |
| RU | 2111152 | 5/1998 |
| WO | 00/00388 | 1/2000 |
| WO | 2004/106158 | 12/2004 |
| WO | 2005/063577 | 7/2005 |

OTHER PUBLICATIONS

International Search Reports, form Nos. PCT/ISA/220, PCT/ISA/210, and PCT/ISA/237.

Federal Service for Intellectual Property, Patents and Trademarks (Rospatent), Russian Patent Office, Decision on Granting, Form No. 01 IZ-2008 English language (4 pgs.), Feb. 2, 2011.

Sugimura International Patent & Trademark Attorneys, Japanese Patent Office, Office Action, English language (2 pgs.), Japenese Language (2 pgs.) Mar. 21, 2012.

* cited by examiner

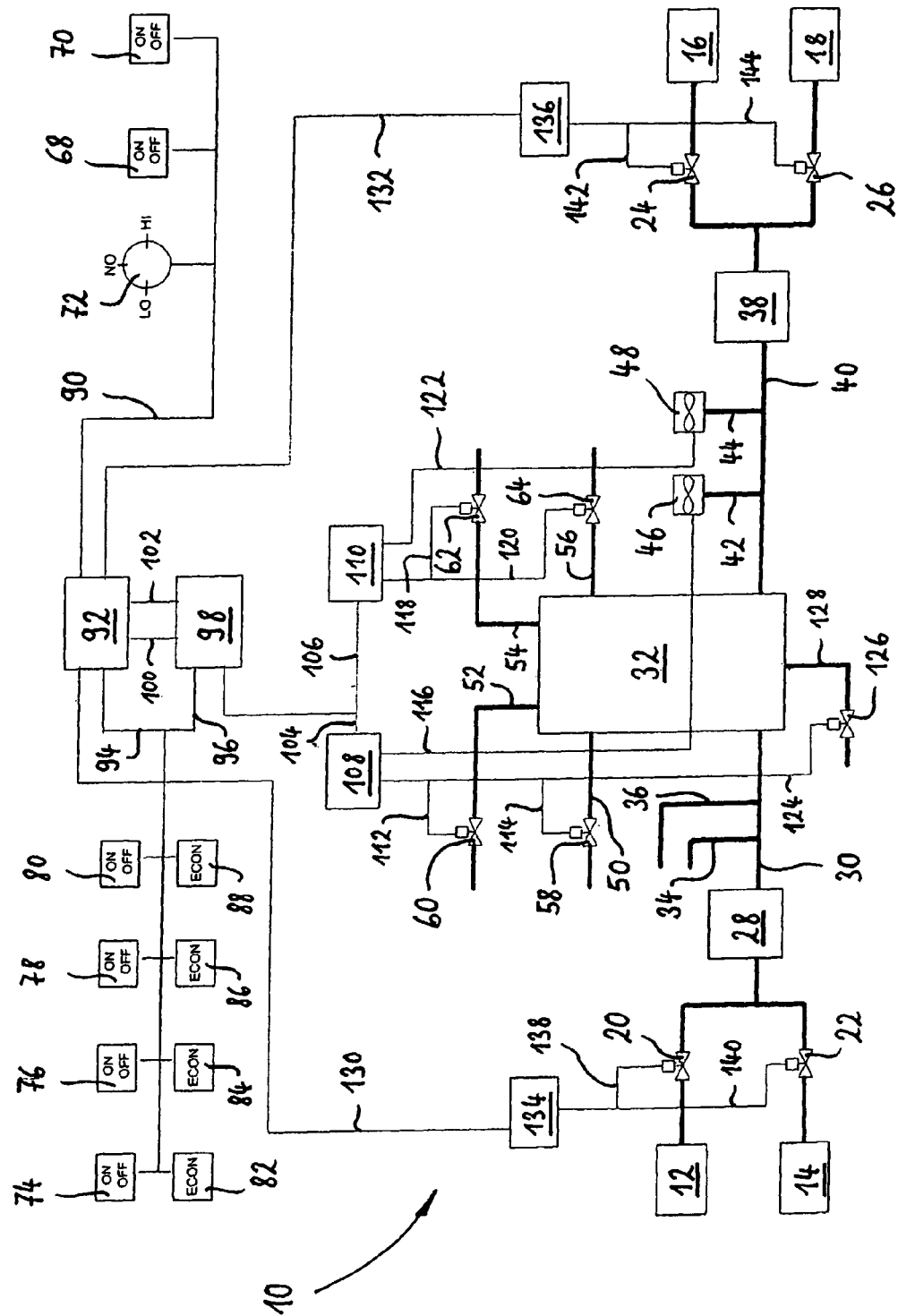

DEVICE AND METHOD FOR DISTRIBUTING AIR IN A CARGO AIRCRAFT

CROSS REFERENCE TO RELATED APPLICATIONS

This application claims the benefit of International Application No. PCT/EP2007/002847, filed on Mar. 29, 2007, and German Application No. DE 10 2006 014 572.0, filed on Mar. 29, 2006.

TECHNICAL FIELD

The invention relates to a device and a method for distributing air in a cargo aircraft.

BACKGROUND

Shutoff valves are provided in air distribution systems of conventional cargo aircraft in order that the air supply to the cargo compartment or the cargo compartments, also called cargo decks, can be shut off in the event of a fire in the cargo compartment. Passenger aircraft do not have shutoff valves of this kind, as the air supply cannot be shut off in these aircraft, even in the event of a fire in the passenger compartment, as breathing air would otherwise no longer be available to the passengers. The above-mentioned shutoff valves, which are integrated into cargo aircraft, are so-called two-position valves, i.e. they are either completely closed in order to interrupt an air supply to the cargo compartment or completely open in order to release the air supply to the cargo compartment. If there is no abnormal occurrence (fire, etc.), a constant volume of fresh air is therefore supplied to the cargo area of a conventional cargo aircraft irrespective of the transported cargo. As is usual in aircraft construction, this fresh air comes from the engine or the engines of the aircraft and is also called bleed air, as it is bled or tapped from a compressor stage of the aircraft turbines. As a result, the production of bleed air of this kind costs fuel, for the bleed air volume is no longer available to the aircraft engine for combustion and must therefore be post-produced by the aircraft engine.

The object of the invention is to minimize the bleed air requirement of a cargo aircraft in order thus to reduce its operating costs.

SUMMARY OF THE INVENTION

The object is achieved according to the invention with a cargo aircraft air distribution system having the features described below. Accordingly, at least one cargo deck is connected to the air distribution system, and the air distribution system comprises a source for bleed air, at least one so-called air conditioning unit for treating the bleed air, a mixing unit which receives treated bleed air from the air conditioning unit and delivers it to the at least one cargo deck, and at least one shut-off valve between the mixing unit and the cargo deck in order to interrupt or completely release the air supply to the cargo deck. In order to reduce the bleed air requirement, a cockpit switch co-operating with the shutoff valve is provided, the operation of which causes the at least one shutoff valve to take up an intermediate position. For this purpose the shutoff valve is formed as a motor-operated control valve which can take up any desired intermediate position between completely open and completely closed positions. A control unit establishes for each possible operating state of the air distribution system a desired air volume balance and adjusts the flow volume through the at least one air conditioning unit in accordance with the desired air volume balance established for the respective operating state such that the pressure in the mixing unit is at a constant, predetermined value.

With an air distribution system according to the invention of this kind, it is possible to adapt the fresh air supply to the cargo deck or decks of the cargo aircraft to the transported cargo. In the case of so-called "living" cargo such as, for example, animals and/or plants, a higher fresh air supply to the cargo deck is required in order to prevent transported animals from dying or transported plants from withering or dying off. However in the case of so-called "dead" cargo, e.g. textiles, machines, electrical and electronic appliances of all kinds, post, etc., according to the invention the fresh air supply to the cargo deck or decks can be distinctly reduced and, for example, only constitute 60% of the fresh air supply which is needed for living cargo. The fuel consumption of the aircraft engines is obviously reduced accordingly through the reduced bleed air requirement. On the one hand the use of the pressure in the mixing unit as a control variable ensures that no overpressure occurs in the air distribution system and therefore no damage is caused to the mixing unit or downstream pipelines, even in the event of faults, and on the other this guarantees that all the zones (areas) of the cargo aircraft which are connected to the mixing unit are supplied with a specified air volume. As already mentioned, the aircraft engines serve as a source for bleed air, with the possibility of an auxiliary power unit (so-called APU) alternatively and/or additionally serving as a bleed air source. Within the scope of the present invention the term "air conditioning unit" denotes so-called AGUs (air generation units) which condition the hot bleed air with regard to pressure and temperature such that it can be supplied as fresh air to the different zones of the aircraft.

According to one embodiment of the air distribution system according to the invention, the cockpit switch which co-operates with the shutoff valve is a press switch whose operation causes the corresponding shutoff valve to take up an intermediate position which is predetermined by software. This intermediate position can therefore easily be adapted to different requirements according to the customer's need. The cockpit switch may alternatively also be a rotary selector by means of which a user can select a desired degree of reduction of the fresh air supply volume according to an actual requirement.

The mixing unit is preferably connected to a bypass valve which optionally discharges air from the mixing unit in order to keep the pressure in the mixing unit constant. This enables a pressure which is required to maintain the cabin pressurisation to be maintained in the mixing unit even if due to a failure cargo areas are completely shut off by means of a shutoff valve or a plurality of shutoff valves. The excess air volume which then arises in the mixing unit is discharged via the bypass valve.

The air distribution system according to the invention is advantageously formed such that the bypass valve discharges any excess pressure from the mixing unit directly into the aircraft bilge.

According to a preferred embodiment, in order that opening of the bypass valve can be delayed for as long as possible, the control unit initially adjusts the flow volume through the at least one air conditioning unit to the minimum throughput which is necessary to maintain the cabin pressurisation and only commands the bypass valve to open when the pressure in the mixing unit is at risk of exceeding the predetermined value, even when the air conditioning unit is adjusted to minimum throughput.

In embodiments with a bypass valve the control unit consequently adjusts the flow volume through the at least one air conditioning unit and through the bypass valve in accordance with the desired air volume balance established for the respective operating state such that the pressure in the mixing unit is at the constant, predetermined value.

In preferred embodiments of the air distribution system according to the invention the mixing unit receives not only the treated bleed air from the air conditioning unit or units, but also recirculation air from a recirculation fan. The control unit then adjusts the throughput of the recirculation fan and the flow volume through the at least one air conditioning unit as well as, if provided, the bypass valve in accordance with the desired air volume balance established for the respective operating state such that the pressure in the mixing unit is at a constant, predetermined value. The recirculation fan enables the air distribution system to be controlled with greater flexibility, as a reduced flow volume through the recirculation fan can be compensated by an increased throughput of the recirculation fan, i.e. the pressure in the mixing unit can be kept constant, although the flow volume through the air conditioning unit is reduced.

In order that the cockpit area and also a courier area can always be supplied with sufficient fresh air and to keep them free from contaminants coming from the cargo area, the cockpit and the courier area are preferably supplied with treated bleed air directly from the at least one air conditioning unit. This means that the bleed air which is supplied to the cockpit and the courier area does not come from the mixing unit, but is instead taken from the air distribution system before entering the mixing unit.

Two shutoff valves are preferably provided for each cargo deck in order to be able to separately shut off and control a front area and a rear area of the cargo deck. A total of four shutoff valves is therefore provided in cargo aircraft with two cargo decks disposed one above the other.

All the shutoff valves of the air distribution system according to the invention are preferably position-monitored. The position monitoring makes provision for feedback to a control unit as to whether or not the shutoff valve position commanded by the control unit has been reached. According to a particularly preferred development, the position monitoring of the shutoff valves is achieved by optical position monitoring.

The object initially mentioned is also achieved according to the invention by a method for distributing air in a cargo aircraft which has at least one cargo deck, wherein the method comprises the following steps:

- selecting a reduced or non-reduced fresh air supply rate for the cargo deck,
- activating a shutoff valve interrupting or releasing the fresh air supply to the cargo deck according to the selection made beforehand,
- establishing a desired air volume balance for the actual operating state of the air distribution system, and
- adjusting the flow volume through an air conditioning unit providing the fresh air in accordance with the desired air volume balance established for the actual operating state such that a constant, predetermined pressure is maintained in a mixing unit of the air distribution system.

The implementation of a method of this kind in a cargo aircraft results in the advantages previously described in connection with the device according to the invention and, in particular, in a significant fuel saving. The establishment of the desired air volume balance for the respective actual operating state of the air distribution system effects an automatic reaction to all selected valve positions and to faults. Moreover, there is automatic compensation of the incoming air supply to the cockpit and to the courier area for all selection possibilities offered by the system and, to a limited degree, also in the case of faults (then limited by the maximum output of the air conditioning unit or packs and of the recirculation fan or fans). It is therefore as a whole possible to obtain a minimized flow through the air conditioning units and therefore a minimized bleed air requirement with a corresponding fuel saving without this having disadvantages for the air distribution in the cockpit and in the courier area.

BRIEF DESCRIPTION OF THE DRAWINGS

A preferred embodiment of the invention is described in detail with regard to structure and function in the following on the basis of a schematic FIGURE;

The sole FIGURE is a simplified block diagram of an air distribution system 10 for a cargo aircraft.

DETAILED DESCRIPTION

In the block diagram of the FIGURE, lines which are drawn thickly represent pipeline connections, whereas the thin lines are signal paths which can be wired or wireless. According to the represented embodiment, the cargo aircraft, which is not represented in detail, has four jet engines 12, 14, 16 and 18 which serve to drive the cargo aircraft and at the same time represent sources for bleed air which is fed into the air distribution system 10 via flow control valves 20, 22, 24 and 26.

In order to treat the bleed air, after flowing through the associated valves 20 and 22, the bleed air coming from the sources 12 and 14 flows into a first air conditioning unit 28. Here the bleed air is cooled and expanded and then leaves the first air conditioning unit 28 through a line 30 which leads to a mixing unit 32. Further lines 34 and 36 branch off the line 30, the line 34 of which routes treated bleed air into the cockpit of the cargo aircraft and the line 36 of which routes treated bleed air into a courier area of the cargo aircraft. The remainder of the treated bleed air passes via the line 30 into the mixing unit 32.

After flowing through the associated valves 24 and 26, the bleed air taken from the sources 16 and 18 flows in a similar manner into a second air conditioning unit 38, is treated here and flows through a line 40 out of the air conditioning unit 38 into the mixing unit 32. Lines 42 and 44 run into the line 40 and lead to two recirculation fans 46 and 48, the function of which is explained in greater detail in the following.

The bleed air passing through the lines 30 and 40 into the mixing unit 32 can be routed out of the mixing unit 32 through lines 50, 52, 54 and 56 into different cargo compartment areas of the cargo aircraft. In the illustrated embodiment the line 50 leads to the rear part of a main cargo deck, the line 56 to a front part of the main cargo deck, the line 52 to a rear part of an upper cargo deck and, finally, the line 54 to a front part of the upper cargo deck. A respective shutoff valve 58, 60, 62 and 64, which is formed as a motor-operated flow control valve, is disposed in each line 50, 52, 54 and 56. These shutoff valves 58, 60, 62 and 64 are not on/off valves which are conventionally used at this location, but can rather be brought into any desired intermediate position in order that an inflow of bleed air from the mixing unit 32 into the connected cargo compartment area can be precision-controlled.

In order to save bleed air, it is known to suck off a part of the air contained in the cargo compartment areas and to again recirculate it into the cargo compartment areas. This air portion is called recirculation air. The above-mentioned recirculation fans 46 and 48 are used for the recirculation, by means of which fans a certain air portion is sucked out of the cargo compartment areas and supplied via the line 40 to the mixing unit 32. This recirculation air is mixed in the mixing unit 32 with fresh bleed air coming from the two air conditioning units 28 and 38 and then supplied through the lines 50 to 56 to the connected cargo compartment areas.

A number of operating elements, which are described in detail in the following, are provided in the cockpit of the cargo aircraft in order to operate the air distribution system 10. A first control panel, which is reproduced on the top right-hand side in the FIGURE, contains a first press switch 68 for turning the first air conditioning unit 28 on and off as well as a second press switch 70 for turning the second air conditioning unit 38 on and off. Also provided here is a rotary switch 72 which allows the bleed air volume flowing to the air conditioning units 28 and 38 to be selected in three steps. This rotary switch 72 is normally in a normal position which is marked by "NO" and in which the bleed air stream to the air conditioning units 28, 38 is automatically controlled. However if, for example, an engine of the aircraft fails, the rotary switch 72 can be turned as prescribed by routines into the position which is marked by "NO" in order thereby to reduce the bleed air stream to the air conditioning units 28, 38, whereby the aircraft engines which are still functioning are relieved of load. Should there be a fire in the cockpit or in the courier area, for example, the position "HI", in which the bleed air stream to the air conditioning units 28, 38 is at a maximum, can be selected by means of the rotary switch 72 in order to obtain the highest possible air throughput for the purpose of more rapid smoke removal.

A further control panel, which is reproduced on the top left-hand side in the FIGURE, enables the shutoff valves 58, 60, 62 and 64 to be operated. A row of press switches 74, 76, 78, 80, which is at the top in the FIGURE, enables the shutoff valves 58, 60, 62 and 64 to be turned on and off, with the term turn on in this connection meaning that the corresponding shutoff valve takes up its open position, while the term turn off means that the associated shutoff valve takes up its closed position.

A further press switch 82, 84, 86, 88 is disposed below each press switch 74, 76, 78, 80, the operation of which further switch causes the associated shutoff valve to take up an intermediate position which is predetermined by software in order to reduce the bleed air supply to the corresponding area of the cargo deck and in this way to save fuel.

The control panel which is on the right in the FIGURE is connected via a signal path 90 to a first control unit 92, while the control panel which is on the left in the FIGURE is connected via a signal path 94 to the first control unit 92 and via a further signal path 96 to a second control unit 98.

The first control unit 92 calculates a desired air volume balance for the air distribution system 10 in accordance with the settings carried out on the two operating panels. The second control unit 98, which is connected to the first control unit 92 via signal paths 100, 102, calculates desired valve position values for the shutoff valves 58, 60, 62 and 64 as well as desired speed values for the recirculation fans 46, 48 in accordance with the established desired air volume balance. These calculated values are transmitted via signal paths 104, 106 to control devices 108, 110 which communicate directly with the shutoff valves and recirculation fans. The control device 108 is in this case connected via signal paths 112, 114 to the shutoff valves 58 and 60 and also via a signal path 116 to the recirculation fan 46. The control device 110 is similarly connected via signal paths 118, 120 to the shutoff valves 62 and 64 as well as via a signal path 122 to the recirculation fan 48. On the one hand the corresponding actuating signals are fed to the shutoff valves and recirculation fans and on the other feedback from the shutoff valves and recirculation fans as to the positions or speeds which are reached is delivered to the control devices 108 and 110, respectively, via the signal paths 112 to 122.

The control device 108 is also connected via a signal path 124 to a bypass valve 126 which is connected via a line 128 to the mixing unit 32. The function of this bypass valve 126 is described in greater detail in the following.

The first control unit 92 is connected via signal paths 130, 132 to two further control devices 134, 136 which are responsible for controlling the flow control valves 20, 22, 24, 26. In accordance with the established desired air volume balance, the control devices 134, 136 are informed by the first control unit 92 via the signal paths 130, 132 which position the flow control valves 20, 22, 24, 26 have to take up to comply with the desired air volume balance. For this purpose the control device 134 is connected via signal paths 138, 140 to the two flow control valves 20 and 22, while the control device 136 is connected via signal paths 142, 144 to the two other flow control valves 24, 26.

The fresh air supply rate to the different areas of the cargo deck can be reduced by the represented architecture, this taking place in a simple manner by operating one or a plurality of the corresponding press switches 82, 84, 86, 88. In the illustrated embodiment the fresh air supply is reduced to a value which is preset by software and dependent on the customer's need. A subsequently desired change of this value can be carried out quickly and without complications on the basis of the software determination of this value. According to an alternative embodiment, which is not represented here, the press switches 82 to 88 are replaced by rotary selectors which enable the fresh air supply to the cargo compartment areas to be reduced steplessly or in a plurality of predetermined steps.

If a reduction of the fresh air supply to corresponding areas of the cargo deck has been selected by means of one or a plurality of the press switches 82 to 88, the bleed air stream through the two air conditioning units 28 and 38 is reduced accordingly without, however, the pressure in the mixing unit 32 changing. For example, the bleed air stream through the air conditioning units 28, 38 can thus be reduced from previously 100% (corresponding to a normal position without reduction of the fresh air supply to the cargo compartments) to 60% without the pressure in the mixing unit 32 changing. The desired air volume balance is therefore observed as before. The cockpit area and also the courier area are not affected by this kind of reduction of the fresh air supply, as these two areas do not draw their fresh air from the mixing unit 32, but rather directly from the first air conditioning unit 28.

The illustrated architecture accordingly ensures that a predetermined throughput through the mixing unit 32 is kept constant. The pressure monitoring in the mixing unit 32 takes place by means of four pressure sensors (not represented), which are independent of one another, in order to guarantee sufficient redundancy of the measured pressure values. The air distribution system 10 monitors the pressure in the mixing unit 32 and, in accordance with the established desired air volume balance, controls the flow control valves 20 to 26 as well as the speed of the recirculation fans 46, 48 according to the selection made through the control panels. The flow control valves 20 to 26 are therefore also formed as motor-operated control valves.

In order to keep a predetermined value of the pressure in the mixing unit 32 and a resultant throughput through the mixing unit 32 constant even when the fresh air supply to one or a plurality of cargo deck area(s) has been completely blocked, excess pressure can be discharged from the mixing unit 32, preferably directly into the bilge of the aircraft, by means of the above-mentioned bypass valve 126. In this way the air distribution system 10 is protected from damage and it is in addition possible to maintain the cabin pressurisation, which requires a certain minimum pressure, even in abnormal occurrence conditions.

The invention claimed is:

1. An air distribution system of a cargo aircraft which includes at least one cargo deck which is connected to the air distribution system, the at least one cargo deck including a plurality of different cargo compartment areas, the system comprising:
   a source for bleed air,
   at least one air conditioning unit that treats the bleed air,
   a mixing unit which receives recirculation air exiting the at least one cargo deck and treated bleed air from the air conditioning unit and delivers an air supply of the recirculation air and the treated bleed air to the at least one cargo deck,
   a plurality of lines, each extending between the mixing unit and one of the different cargo compartment areas, such that the air supply from the mixing unit is routed out of the mixing unit through the plurality of lines to the different cargo compartment areas,
   at least one shut-off valve in the form of a motor-operated control valve located in each of the plurality of lines extending between the mixing unit and the at least one cargo deck in order to interrupt or completely release the air supply to each of the corresponding different cargo compartment areas of the at least one cargo deck,
   a cockpit switch located in a cockpit of the cargo aircraft and co-operating with the at least one shutoff valve to cause the at least one shutoff valve to take up an intermediate position between a position interrupting the air supply to the at least one cargo deck and a position completely releasing the air supply to the at least one cargo deck, and
   a control unit that determines a desired air volume balance for a plurality of operating states of the air distribution system and that adjusts flow volume through the at least one air conditioning unit in a current operating state of the air distribution system in accordance with the desired air volume balance determined for the respective current operating state such that air flow into and out of the mixing unit is equalized to cause a pressure prevailing in the mixing unit to remain at a constant, predetermined value for all of the plurality of operating states,
   wherein the mixing unit receives the recirculation air from a recirculation fan, and the control unit adjusts the throughput of the recirculation fan and the flow volume through the at least one shut-off valve in accordance with the desired air volume balance established for the respective current operating state.

2. The air distribution system according to claim 1, further comprising:
   a bypass line extending between the mixing unit and a bilge of the cargo aircraft, the bypass line being independent from the plurality of lines extending between the mixing unit and the at least one cargo deck, and
   a bypass valve located in the bypass line and which is actuated separately from the at least one shut-off valve to optionally discharge pressure from the mixing unit.

3. The air distribution system according to claim 2, wherein the control unit adjusts the flow volume through the at least one air conditioning unit to a minimum throughput before commanding the bypass valve to open.

4. The air distribution system according to claim 3, wherein the control unit adjusts the flow volume through the at least one air conditioning unit and also through the bypass valve in accordance with the desired air volume balance established for the respective current operating state such that the pressure prevailing in the mixing unit remains at the constant, predetermined value.

5. The air distribution system according to claim 1, wherein the cockpit and a courier area of the cargo aircraft are supplied with treated bleed air directly from one air conditioning unit.

6. The air distribution system according to claim 1, wherein the at least one shutoff valve includes two shutoff valves located between the mixing unit and the at least one cargo deck for each cargo deck.

7. The air distribution system according to claim 6, wherein each of the shutoff valves are position-monitored.

8. A method for distributing air in a cargo aircraft which includes at least one cargo deck connected to an air distribution system, the at least one cargo deck including a plurality of different cargo compartment areas, the method comprising:
   treating bleed air from a source of bleed air with an air conditioning unit on board the cargo aircraft, mixing the treated bleed air with recirculation air exiting the at least one cargo deck in a mixing unit to produce a fresh air supply to be delivered to the at least one cargo deck,
   delivering the fresh air supply via a plurality of lines, each extending between the mixing unit and one of the different cargo compartment areas, from the mixing unit to the different cargo compartment areas,
   selecting a reduced or non-reduced fresh air supply rate to be supplied to a selected one of the different cargo compartment areas chosen from the at least one cargo deck,
   activating at least one shutoff valve in the form of a motor-operated control valve, with the at least one shutoff valve located in each of the plurality of lines extending between the mixing unit and the selected cargo compartment area, thereby interrupting or releasing the fresh air supply to the selected cargo compartment area according to the selected fresh air supply rate, the at least one shutoff valve defining at least one intermediate position at which a cockpit switch may set the shutoff valve between positions interrupting and completely releasing the fresh air supply to the selected cargo compartment area,
   establishing a desired air volume balance for a plurality of operating states including a current operating state of the air distribution system,
   adjusting flow volume through the air conditioning unit in accordance with the desired air volume balance established for the current operating state such that air flow into and out of the mixing unit is equalized to cause a pressure prevailing in the mixing unit to remain at a constant, predetermined value for all of the plurality of operating states, and
   controlling a fan speed of a recirculation fan that causes the recirculation air to flow into the mixing unit, and controlling flow through the at least one shutoff valve, in accordance with the desired air volume balance established for the current operating state.

9. The method according to claim 8, further comprising:
   discharging pressure from the mixing unit with a bypass valve located in a bypass line in the event of an abnormal occurrence, the bypass line being independent from the plurality of lines extending between the mixing unit and the at least one cargo deck, and the bypass valve being actuated separately from the at least one shutoff valve, and delivering a bypass flow from the mixing unit to a bilge of the cargo aircraft via the bypass line when the bypass valve discharges pressure from the mixing unit.

10. The method according to claim 9, further comprising: adjusting the flow volume through the air conditioning unit to be a minimum throughput before discharging pressure from the mixing unit.

11. The method according to claim 8, further comprising: controlling a supply of bleed air to the air conditioning unit in order to maintain the pressure in the mixing unit of the air distribution system.

* * * * *